United States Patent
Chu

(10) Patent No.: US 11,009,401 B2
(45) Date of Patent: May 18, 2021

(54) DUAL-SENSOR WATERPROOF TEMPERATURE MONITORING PROBE AND ASSOCIATED SYSTEMS AND METHODS

(71) Applicant: Ewig Industries Macao Commercial Offshore Limited, Macau (CN)

(72) Inventor: Luk Wah Jackson Chu, Hong Kong (CN)

(73) Assignee: EWIG INDUSTRIES MACAO COMMERCIAL OFFSHORE LIMITED, Macau (CN)

( * ) Notice: Subject to any disclaimer, the term of this patent is extended or adjusted under 35 U.S.C. 154(b) by 747 days.

(21) Appl. No.: 15/652,557

(22) Filed: Jul. 18, 2017

(65) Prior Publication Data

US 2019/0025130 A1    Jan. 24, 2019

(51) Int. Cl.
| | |
|---|---|
| *G01K 7/00* | (2006.01) |
| *G01K 1/08* | (2021.01) |
| *G01K 1/024* | (2021.01) |
| *G01K 13/00* | (2021.01) |

(52) U.S. Cl.
CPC .............. *G01K 1/08* (2013.01); *G01K 1/024* (2013.01); *G01K 13/00* (2013.01); *G01K 2207/06* (2013.01)

(58) Field of Classification Search
CPC combination set(s) only.
See application file for complete search history.

(56) References Cited

U.S. PATENT DOCUMENTS

| | | | |
|---|---|---|---|
| 3,497,398 A | | 2/1970 | Ehrenberg et al. |
| 3,923,552 A | * | 12/1975 | Parris ........................ G01K 1/08 |
| | | | 136/234 |
| 4,291,576 A | | 9/1981 | Deane |
| (Continued) | | | |

OTHER PUBLICATIONS

Non-Final Rejection in U.S. Appl. No. 16/159,411 dated Feb. 6, 2020, 8 pp.

(Continued)

*Primary Examiner* — Lisa M Caputo
*Assistant Examiner* — Nasir U. Ahmed
(74) *Attorney, Agent, or Firm* — Lathrop GPM LLP

(57) ABSTRACT

In an aspect, a dual-sensor waterproof temperature monitoring probe includes: a hollow tube formed with a first diameter at a first end and a second diameter at a second end; a first temperature sensor located within the hollow tube at the first end; a second temperature sensor located within the hollow tube at the second end; a temperature sensor holder configured to fit within the second diameter of the hollow tube and to position the second temperature sensor adjacent an inside surface of the hollow tube; one or more first electrical wires electrically coupled with the first temperature sensor; one or more second electrical wires electrically coupled with the second temperature sensor; and a handle permanently sealing the hollow tube at the second end and sealing around the first and second electrical wires. In another aspect, a dual-sensor waterproof temperature monitoring probe includes a primary hollow tube and an auxiliary hollow tube. In this aspect, a first temperature sensor is located inside the primary hollow tube at the first closed end and a second temperature sensor may be located inside the auxiliary hollow tube.

12 Claims, 14 Drawing Sheets

(56) References Cited

U.S. PATENT DOCUMENTS

| | | | |
|---|---|---|---|
| 4,527,909 A * | 7/1985 | Dale | G01K 1/08 |
| | | | 136/230 |
| 6,811,308 B2 | 11/2004 | Chapman et al. | |
| 7,004,626 B1 | 2/2006 | Giberson et al. | |
| 2004/0258129 A1 | 12/2004 | Rund | |
| 2006/0054558 A1* | 3/2006 | Jones | B01D 15/161 |
| | | | 210/656 |
| 2007/0258506 A1 | 11/2007 | Schwagerman et al. | |
| 2008/0043809 A1* | 2/2008 | Herbert | G01K 1/026 |
| | | | 374/163 |
| 2008/0259995 A1 | 10/2008 | Kuhn | |
| 2013/0149884 A1 | 6/2013 | Shaw | |
| 2013/0182745 A1* | 7/2013 | Hertel | G01R 3/00 |
| | | | 374/185 |
| 2013/0329767 A1* | 12/2013 | Jambor | G01K 1/08 |
| | | | 374/185 |
| 2014/0005508 A1* | 1/2014 | Estes | A61B 5/1495 |
| | | | 600/347 |
| 2014/0086274 A1* | 3/2014 | Henke | G01K 1/026 |
| | | | 374/142 |
| 2014/0298903 A1 | 10/2014 | Goto et al. | |
| 2015/0168232 A1 | 6/2015 | Chu | |
| 2016/0004956 A1 | 1/2016 | Reynolds et al. | |

OTHER PUBLICATIONS

Non-Final Rejection in U.S. Appl. No. 15/785,392 dated Apr. 6, 2018, 16 pp.

* cited by examiner

SECTION A—A

DUAL-SENSOR WATERPROOF TEMPERATURE MONITORING PROBE AND ASSOCIATED SYSTEMS AND METHODS

FIELD OF THE INVENTION

This invention relates generally to cooking accessories and specifically to waterproof food thermometer probes and associated methods of manufacturing such probes.

BACKGROUND

Accurate measurement of meat temperature is critical for preventing food-borne illnesses and fatalities. To this end, thermometer probes have gained popularity for grilling and baking purposes. Temperature probe products are generally separated into two categories: "leave-in" probes and "instant read" thermometers. Instant read thermometers allow temperature to be read quickly when inserted into meat. However, these thermometers should not remain in a food during cooking, since any plastic covering cannot withstand high temperatures utilized during cooking. Leave-in probes are designed to remain in a food during cooking, but often fail when moisture enters the probe where the display-unit cable connects to the probe. Such probes fail when washed in an automatic dishwasher, making them a hassle to clean.

SUMMARY

In an aspect, a dual-sensor waterproof temperature monitoring probe includes: a hollow tube formed with a first diameter at a first end and a second diameter at a second end; a first temperature sensor located within the hollow tube at the first end; a second temperature sensor located within the hollow tube at the second end; a temperature sensor holder configured to fit within the second diameter of the hollow tube and to position the second temperature sensor adjacent an inside surface of the hollow tube; one or more first electrical wires electrically coupled with the first temperature sensor; one or more second electrical wires electrically coupled with the second temperature sensor; and a handle permanently sealing the hollow tube at the second end and sealing around the first and second electrical wires.

In an embodiment, the hollow tube further includes a pointed tip at the first end. In an embodiment, the hollow tube further includes a transition between the first diameter and the second diameter. In an embodiment, the transition includes a taper. In an embodiment, the taper is linear, concave, or convex.

In an embodiment, the handle prevents water from entering the hollow tube and being capable of substantially retaining structural and chemical integrity at temperatures up to about 500 degrees Fahrenheit.

In an embodiment, the temperature sensor holder includes a central groove for capturing the second temperature sensor and for positioning the second temperature sensor adjacent the inside surface of the hollow tube.

In an embodiment, the central groove is straight. In another embodiment, the central groove has an internal angle, the internal angle shaped to tightly fit the second temperature sensor.

In an embodiment, the central groove is formed by folding material of the temperature sensor holder.

In an embodiment, the probe further includes a thermally conductive material for providing a thermal coupling between the inner surface of the hollow tube and the second temperature sensor.

In an embodiment, the probe further includes an adhesive, the adhesive being between the second temperature sensor and the temperature sensor holder.

In an embodiment, the temperature sensor holder further includes additional passages, the additional passages being capable of having the one or more second electrical wires pass therethrough. In another embodiment, the temperature sensor holder is formed of an electrically insulating material. In another embodiment, the temperature sensor holder has an electrically insulating coating.

In another aspect, a dual-sensor waterproof temperature monitoring probe includes: a primary hollow tube having a first open end and a first closed end; an auxiliary hollow tube having a shorter length than the primary hollow tube, the auxiliary hollow tube having a second open end and a second closed end, and the auxiliary tube being positioned parallel to and adjacent to the primary hollow tube; a first temperature sensor located inside the primary hollow tube at the first closed end.

A second temperature sensor may be located inside the auxiliary hollow tube at the second closed end; one or more first electrical wires electrically coupled with the first temperature sensor; one or more second electrical wires electrically coupled with the second temperature sensor; a cable, the cable including the one or more first electrical wire and the one or more second electrical wires; and a handle permanently covering and permanently sealing the first open end and the second open end and around at least part of the cable.

In an embodiment, the first open end of the primary hollow tube includes a pointed tip.

In an embodiment, the primary and the auxiliary hollow tubes are coupled together by an adhesive. In another embodiment, the primary and the auxiliary hollow tubes are coupled together by welding.

In an embodiment, the auxiliary hollow tube has a smaller diameter than the primary hollow tube. In an embodiment, the first open end and second open end are flush with each other.

In an embodiment, the handle prevents water from entering the primary and auxiliary hollow tubes and is capable of substantially retaining structural and chemical integrity at temperatures up to about 500 degrees Fahrenheit.

In another aspect, a method for manufacturing a dual-sensor waterproof temperature monitoring probe includes: manufacturing a hollow tube, the hollow tube having a first diameter at a first end and a second diameter at a second; positioning a first temperature sensor within the hollow tube at the first end, the first temperature sensor being electrically coupled to one or more first electrical wires; forming a temperature sensor holder with a central groove capable of fitting a second temperature sensor; positioning the second temperature sensor within the central groove, the second temperature sensor being electrically coupled to one or more second electrical wires; inserting the temperature sensor holder inside a hollow tube such that the second temperature sensor is adjacent an inner surface of the hollow tube. In an embodiment of this method, the temperature sensor holder includes an electrically insulating material. In an embodiment of this method, the temperature sensor includes an electrically conducting material and an electrically insulating coating. In an embodiment of this method, the step of manufacturing the temperature sensor holder further includes injecting a material into a mold to form the temperature sensor holder with the central groove. In an embodiment of this method, the step of manufacturing the temperature sensor holder further includes applying pressure and/or heat to a flat material to form the temperature sensor holder with the central groove. In an embodiment of this method, the step of manufacturing the temperature sensor holder further includes forming one or more additional grooves in the temperature sensor holder. In an embodiment of this method, the method further includes applying a thermally conductive paste between the temperature sensor and the inner surface of the hollow tube. In an embodiment of this method, the central groove has an internal angle capable of tightly fitting the second temperature sensor. In an embodiment of this method, the method further includes forming a handle, the handle permanently sealing the hollow tube at the second end and sealing around the one or more first and second electrical wires, the handle further preventing water from entering the hollow tube and being capable of substantially retaining structural and chemical integrity at temperatures up to about 500 degrees Fahrenheit. In an embodiment of this method, the hollow tube further includes a transition between the first diameter and the second diameter, the transition comprising a taper. In an embodiment of this method, the taper is linear, concave, or convex.

In another aspect, a method for manufacturing a dual-sensor waterproof temperature monitoring probe includes: manufacturing a primary hollow tube and an auxiliary hollow tube, the primary hollow tube having a first open end and a first closed end, the auxiliary hollow tube having a second open end and a second closed end, the auxiliary hollow tube having a shorter length than the primary hollow tube; attaching the auxiliary hollow tube to the primary hollow tube, the auxiliary hollow tube being parallel to the primary hollow tube; positioning a first and a second temperature sensor within the primary and the auxiliary hollow tubes, respectively, the first and second temperature sensors being electrically coupled to one or more first and second electrical wires, respectively; forming a cable, the couple comprising the one or more first and second electrical wires; and forming a handle, the handle permanently sealing the hollow tube at the second end and sealing around the one or more first and second electrical wires, the handle further preventing water from entering the hollow tube and being capable of substantially retaining structural and chemical integrity at temperatures up to about 500 degrees Fahrenheit. In an embodiment of this method, the method further includes inserting a first glass fiber tube the primary hollow tube and inserting a second glass fiber tube within the auxiliary hollow tube. In an embodiment of this method, the method further includes securing a primary first seal within the primary hollow tube and an auxiliary first seal within the auxiliary hollow tube, the primary and auxiliary first seals each comprising a heat-shrink material covering a portion of the cable and a portion of the primary and auxiliary hollow tubes, respectively, at the first open end and second end, respectively.

DETAILED DESCRIPTION

A dual-sensor waterproof temperature monitoring probe may be used to continuously sense both a food temperature and a cooking environment temperature. The dual-sensor waterproof temperature monitoring probe measures temperature at two separate locations during cooking or heating of the food. The dual-sensor waterproof temperature monitoring probe has two temperature sensors: a food temperature sensor is positioned at a tip of the probe for sensing internal food temperature, and an ambient temperature sensor is positioned away from the tip to sense temperature of an ambient medium (e.g., air) in which the food is cooking. In certain embodiments, both the food temperature sensor and the ambient temperature sensor are disposed inside a single tube of the probe. In other embodiments, the ambient temperature sensor is disposed adjacent to a tube containing the food temperature sensor.

The term "waterproof" refers to the dual-sensor waterproof temperature monitoring probe passing standard IPX5 and/or IPX6 tests.

Figure 1:
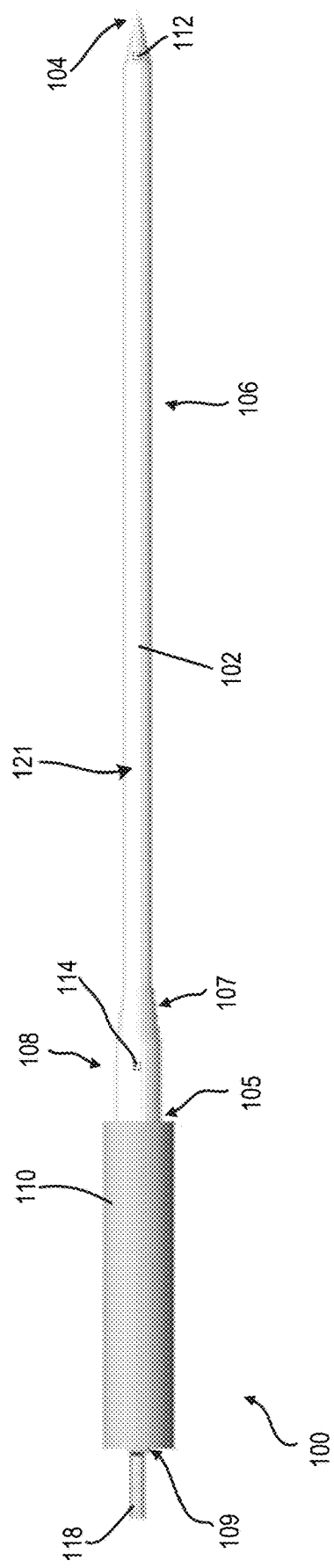
FIG. 1 depicts one example dual-sensor waterproof temperature monitoring probe, in an embodiment.
Figure 2:
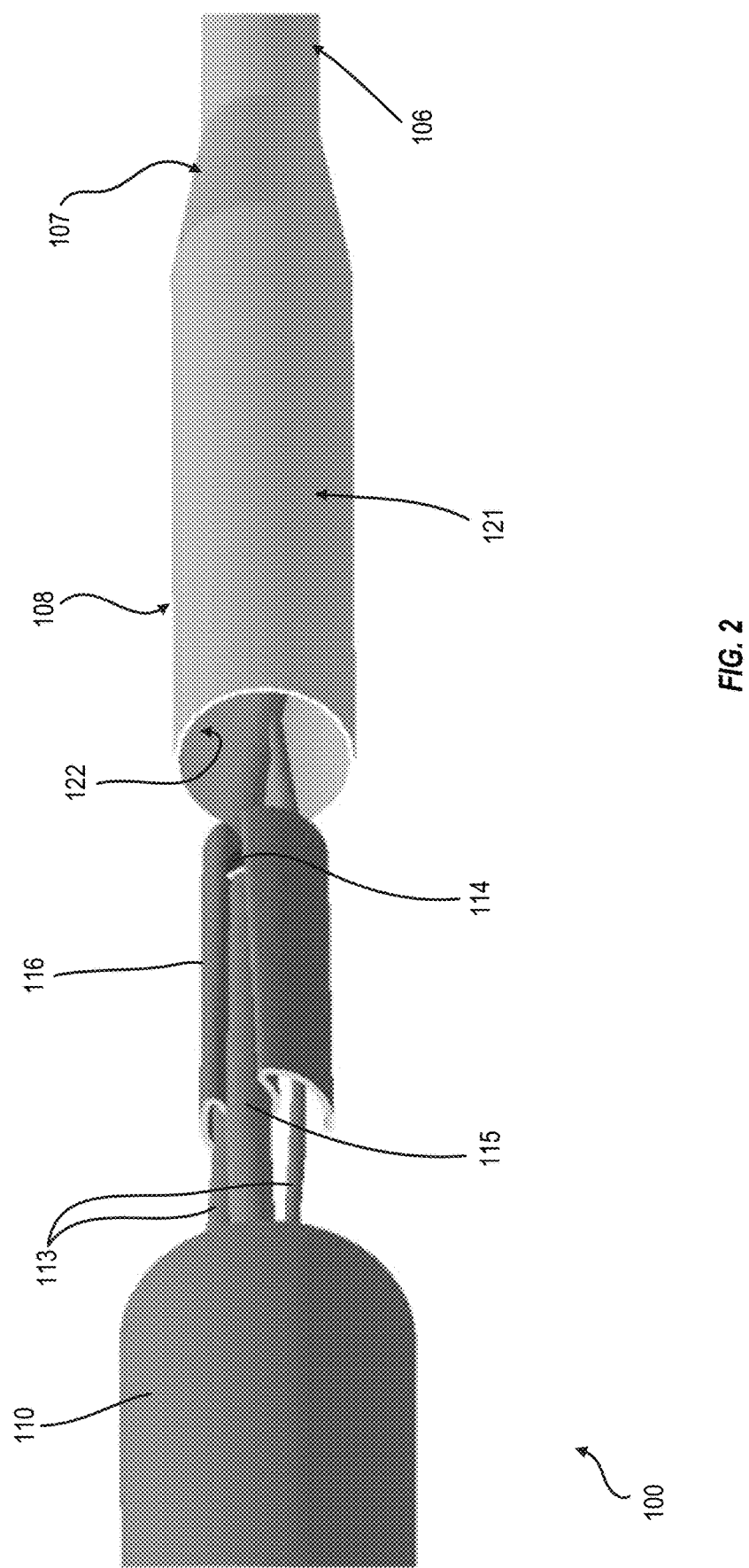
FIG. 2 shows internal components of the dual-sensor waterproof temperature monitoring probe of FIG. 1.
Figure 3:
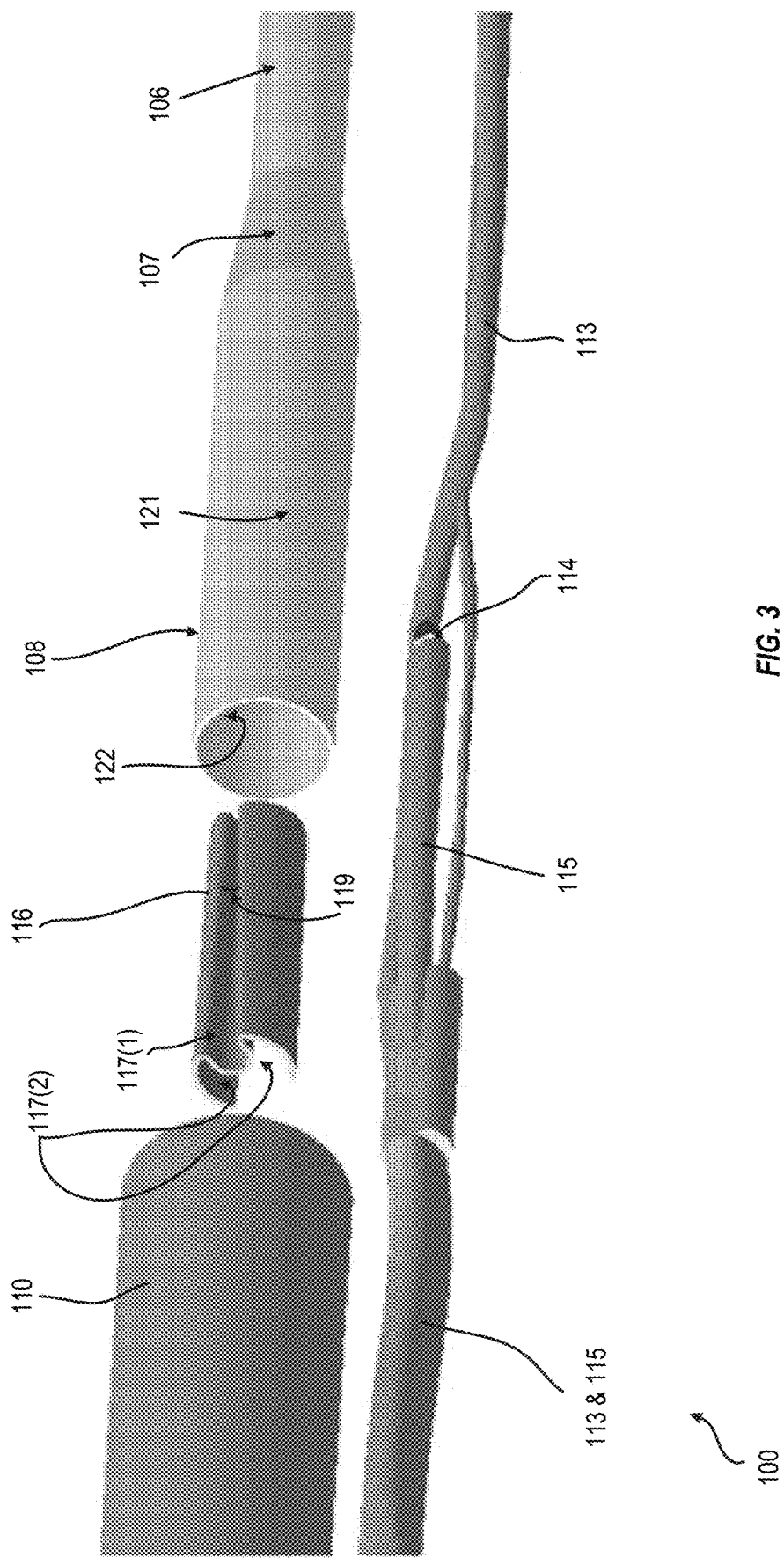
FIG. 3 is an expanded view of the internal components of the dual-sensor waterproof temperature monitoring probe of FIG. 1.
Figure 11:
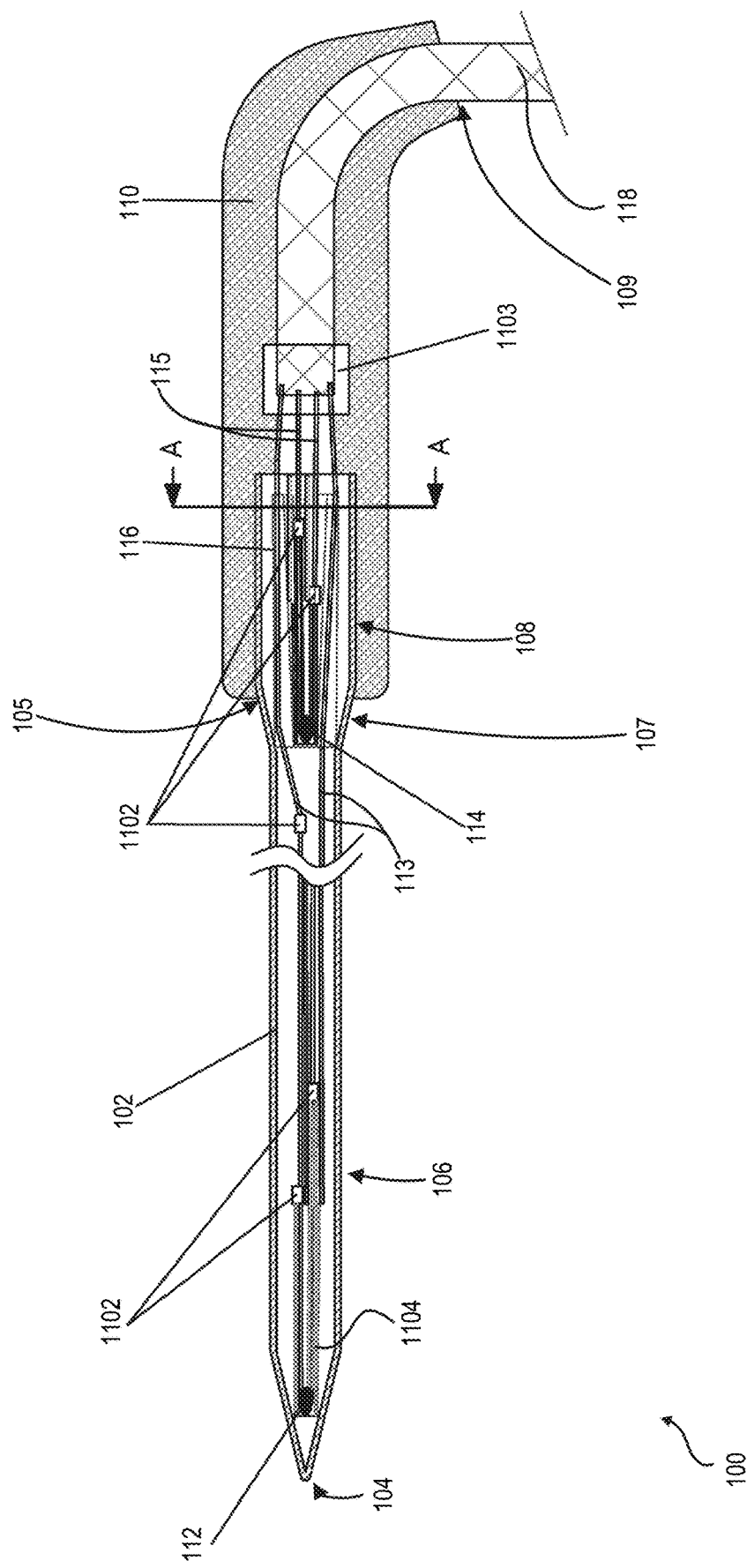
FIG. 11 is a partial cross-sectional view of an embodiment of the dual-sensor waterproof temperature monitoring probe of FIGS. 1-3.
Figure 12A:
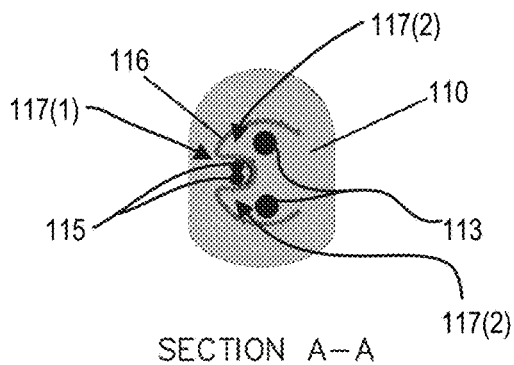
FIG. 12A is a cross-sectional view of the dual-sensor waterproof temperature monitoring probe of FIG. 11 along section line A-A.
Figure 12B:
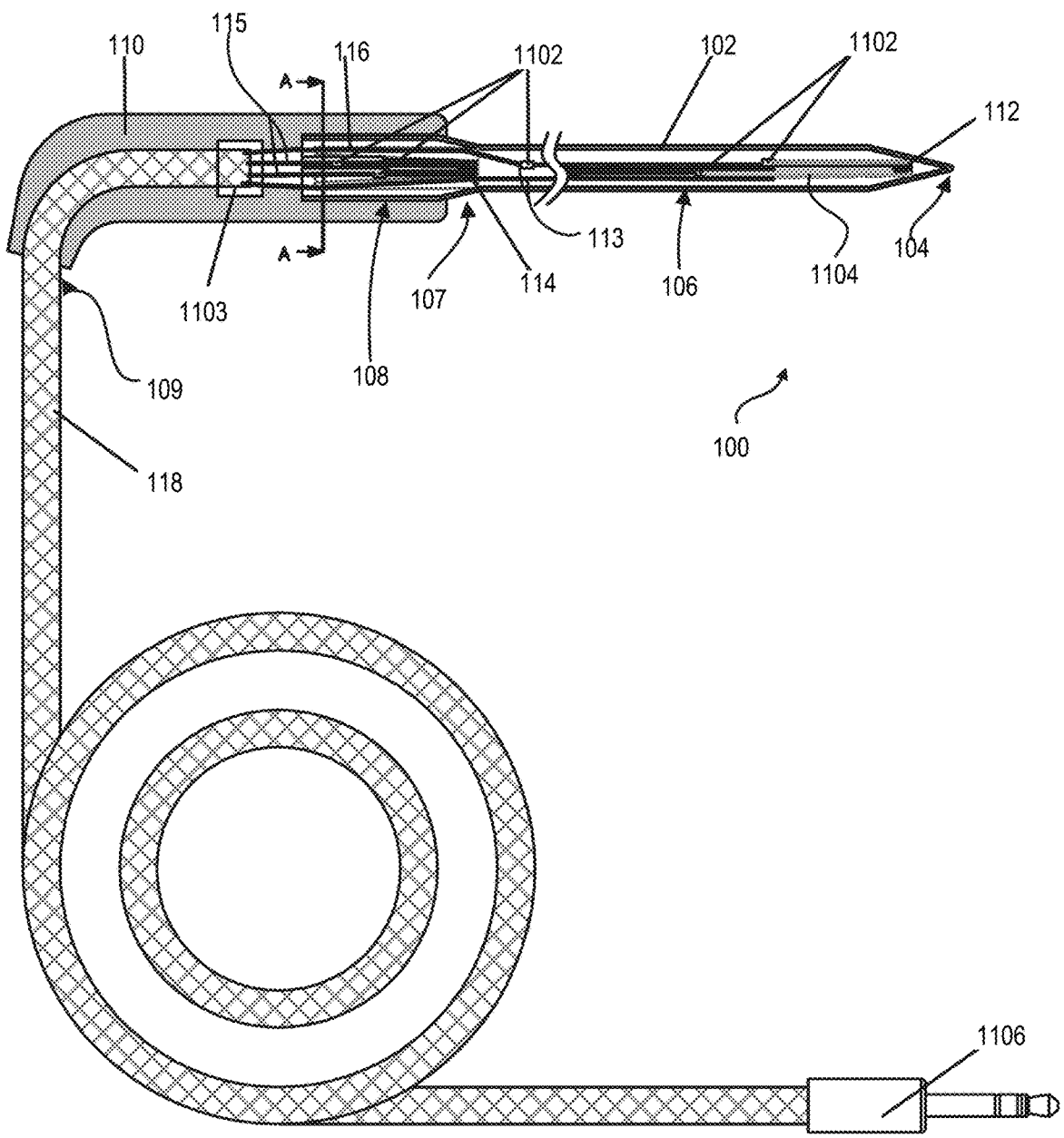
FIG. 12B is another partial cross-sectional view of the dual-sensor waterproof temperature monitoring probe of FIG. 11.

FIG. 1 depicts one example dual-sensor waterproof temperature monitoring probe 100. FIG. 2 shows internal components of dual-sensor waterproof temperature monitoring probe 100 of FIG. 1. FIG. 3 is an expanded view of the internal components of dual-sensor waterproof temperature monitoring probe 100 of FIG. 1. FIGS. 11, 12A, and 12B show partial cross-sectional views of an embodiment of probe 100. FIGS. 1-3, 11, and 12A-12B are best viewed together with the following description.

Dual-sensor waterproof temperature monitoring probe 100 is configured for in situ monitoring temperature of food during the cooking process. Probe 100 includes a hollow tube 102 having a first end 104 configured to penetrate food and having a first diameter 106, a second diameter 108 proximate a second end 105 of tube 102, and a transition 107 between first diameter 106 and second diameter 108. In certain embodiments, hollow tube 102 at first end 104 is closed or sealed. In an embodiment, first end 104 includes a pointed tip. Transition 107 between first diameter 106 and second diameter 108 may be a taper, or may be differently shaped, without departing from the scope hereof. For example, transition 107 may be linear, concave, or convex in form. In another embodiment, the transition between diameters 106 and 108 may be abrupt.

In one example of operation, a portion or all of hollow tube 102 at first diameter 106 is disposed within the food item and hollow tube 102 at second diameter 108 remains outside of the food item. Advantageously, transition 107 provides a stopping point during insertion of probe 100 into a food item to prevent probe 100 from being inserted too far into the food item.

Probe 100 includes a food temperature sensor 112 positioned within and at first end 104 of tube 102 and an ambient temperature sensor 114 positioned within tube 102 at second diameter 108. Probe 100 further includes wires 113 and wires 115. Wires 113 are electrically coupled to food temperature sensor 112 and wires 115 are electrically coupled to ambient temperature sensor 114. Wires 113 are electrically insulated or isolated from wires 115 and, in embodiments, tube 102 inside probe 100. In one embodiment, as illustrated in FIGS. 11 and 12B, sensor 112 is coupled to wires 113 and sensor 114 is coupled to wires 115 via copper clips or bump welds 1102. In one embodiment, hollow tube 102 is made from metal, such as stainless steel. In another embodiment, hollow tube 102 is made from high temperature resistant plastic. However, hollow tube 102 may be made from one or more other materials capable of retaining structural and chemical integrity at cooking temperatures (e.g., up to about 500 degrees Fahrenheit) without departing from the scope hereof. As used herein, structural and chemical integrity may be "retained" when the material does not disintegrate, or otherwise deform when exposed to a given temperature or composition (e.g. meat, water, etc.) An outer surface 121 of hollow tube 102 may have a non-stick coating (e.g., Teflon®) for ease of cleaning.

Wires 113 and 115 exit probe 100 at a back end 109, opposite of first end 104, of tube 102 as illustrated in FIG. 1. At back end 109, wires 113 and 115 are grouped together to form a cable 118. Wires 113 are electrically insulated or isolated from wires 115 within cable 118, which may include a braided wire shell. The braided wire shell may be completely sealed and formed of stainless steel to provide resistance to moisture and temperature. Metal (e.g., copper) clip 1103 may be used to couple wire 113 and 115 to cable 118 within handle 110.

In certain embodiments, probe 100 includes certain features of the food thermometer probe of U.S. patent application Ser. No. 14/133,266 to Chu, et al (hereinafter referred to as "Chu"), which is incorporated herein by reference. For example, present probe 100 may include a glass fiber tube (e.g., Chu item 112, FIG. 1) positioned within hollow tube 102 to thermally insulate wires 113 within hollow tube 102 from high temperatures. The glass fiber tube (e.g., Chu item 112, FIG. 1) may extend along at least part of hollow tube 102 between first end 104 and second end 105, but without surrounding temperature sensors 112 and 114.

In certain embodiments, probe 100 includes a first seal (e.g., Chu item 114, FIG. 1) and a second seal (e.g., Chu item 116, FIG. 1). The first seal is, for example, a Teflon® heat-shrink tube surrounding at least part of the glass fiber tube (e.g., Chu item 112, FIG. 1). In this embodiment, the first seal fills a space between an inner surface 122 of hollow tube 102 and an outer surface of the glass fiber tube to prevent ingress of moisture. The first seal may extend along a portion of hollow tube 102 of probe 100. The second seal is, for example, a Teflon® heat-shrink tube surrounding at least a portion of wires 113 and 115 and hollow tube 102 proximate to second end 105. The second seal may surround wires 113 and/or 115 (FIG. 11) within hollow tube 102. Second seal provides a moisture barrier to prevent moisture from entering between wires 113 and 115 and hollow tube 102. The second seal may also provide thermal protection for respective wires 113 and/or 115 during probe operation and/or during manufacture of the probe (e.g., during high temperature mold injection).

Probe 100 may further include a third seal 1104 within hollow tube 102 and at first end 104 to provide additional electrical insulation between wires 113 and hollow tube 102. Third seal 1104 may further provide additional thermal insulation to protect wires 113. Third seal 1104 may be, for example, a Teflon® heat-shrink tube. Third seal 1104 may include more than one seal (e.g., more than one Teflon® heat-shrink tube).

Probe 100 further includes an ambient temperature sensor holder 116, as seen in FIGS. 2-3, for example. Holder 116 is specially designed for tight fitting inside second diameter 108. Ambient sensor 114 is fit within a central groove 117(1) of ambient temperature sensor holder 116, as shown in FIGS. 2-3. Holder 116 is designed to position ambient temperature 114 adjacent inner surface 122 of hollow tube 102. Central groove 117(1) may be a fold. In another embodiment, central groove 117(1) may be a groove formed as a result of cutting or etching a groove. In certain embodiments, central groove 117(1) is straight. In other embodiments, central groove 117(1) has an internal angle 119, such as illustrated in FIG. 3, designed to fit temperature sensor 114 tightly within. Ambient sensor 114 may be further secured in holder 116 with an adhesive. A thermal coupling (e.g., a thermally conductive material, such as a paste, not restricted to an adhesive) may be used to thermally connect ambient sensor 114 with hollow tube 102 at second diameter 108, for improved sensitivity of ambient temperature sensor 114 to ambient temperatures. In an example, the thermal coupling is Permatex® HI-Temp Red RTV Silicone Gasket, which is resistant to temperatures up to 650 Fahrenheit. Optionally, holder 116 may include additional grooves, or folds, such as 117(2), as shown in FIGS. 3 and 12A, for example. Wires 113 may fit through grooves 117(2), as illustrated in FIG. 2. A cross-sectional view of an embodiment of holder 116 is illustrated in FIG. 12A. In an embodiment, holder 116 may be formed of an electrically insulating material, such as a polymer. In an alternative embodiment, holder 116 is made of an electrically conductive material, such as a metal, and, in embodiments, the surface of holder 116 may be coated with an electrically insulating material.

Probe 100 further includes a handle 110, which surrounds second diameter 108 and wires 113 and 115 between second 105 and back end 109. In an embodiment, handle 110 may envelope tube 102 at second diameter 108, as illustrated in FIGS. 11 and 12B, for example. Handle 110 provides a permanent waterproof seal, preventing moisture from entering inside probe 100, such that probe 100 is waterproof. Therefore, probe 100 may be washed manually, soaked in water, or washed in an automatic dishwasher. Handle 110 may provide thermal insulation. Handle 110 may be formed of a high temperature resistant injected plastic. For example, handle 110 is formed of 20% glass-filled polyether ether ketone (PEEK), having a thermal conductivity of 0.29 $Wm^{-1}K^{-1}$. In certain embodiments, handle 110 is formed by methods taught by Chu. Handle 110 retains structural and chemical integrity at cooking temperatures (for example, up to at least 500 degrees Fahrenheit).

Probe 100 may further include a securing structure (e.g., Chu item 144, FIG. 1) to prevent handle 110 from separating from probe 100 during cooking and washing. The securing structure is for example one or more protrusions that extend radially from tube 102 that are retained by handle 110. The securing structure may be formed by methods taught by Chu. Probe 100 may use other forms of the securing structure such as Chu item 842 (Chu FIG. 8), Chu items 942-945 (Chu FIG. 9), and Chu items 1042-1045 (Chu FIG. 10).

Figure 4:
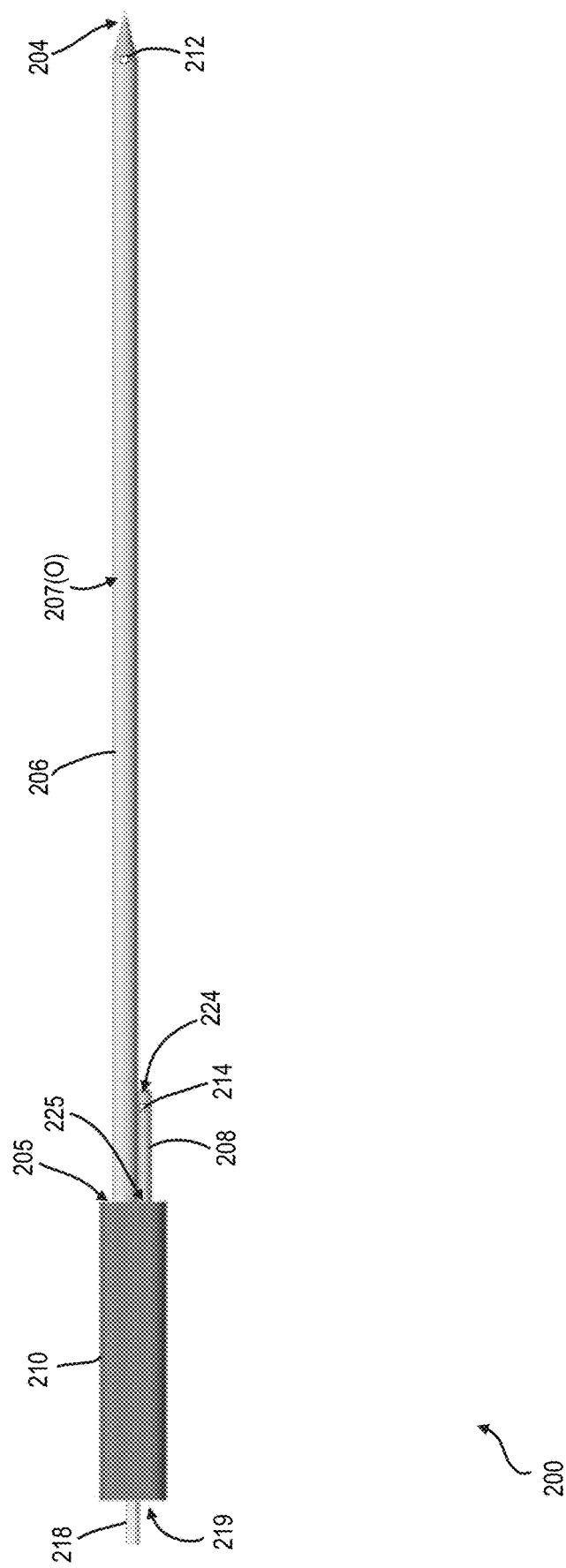
FIG. 4 depicts an example dual-sensor waterproof temperature monitoring probe with an auxiliary hollow tube, in another embodiment.
Figure 5:
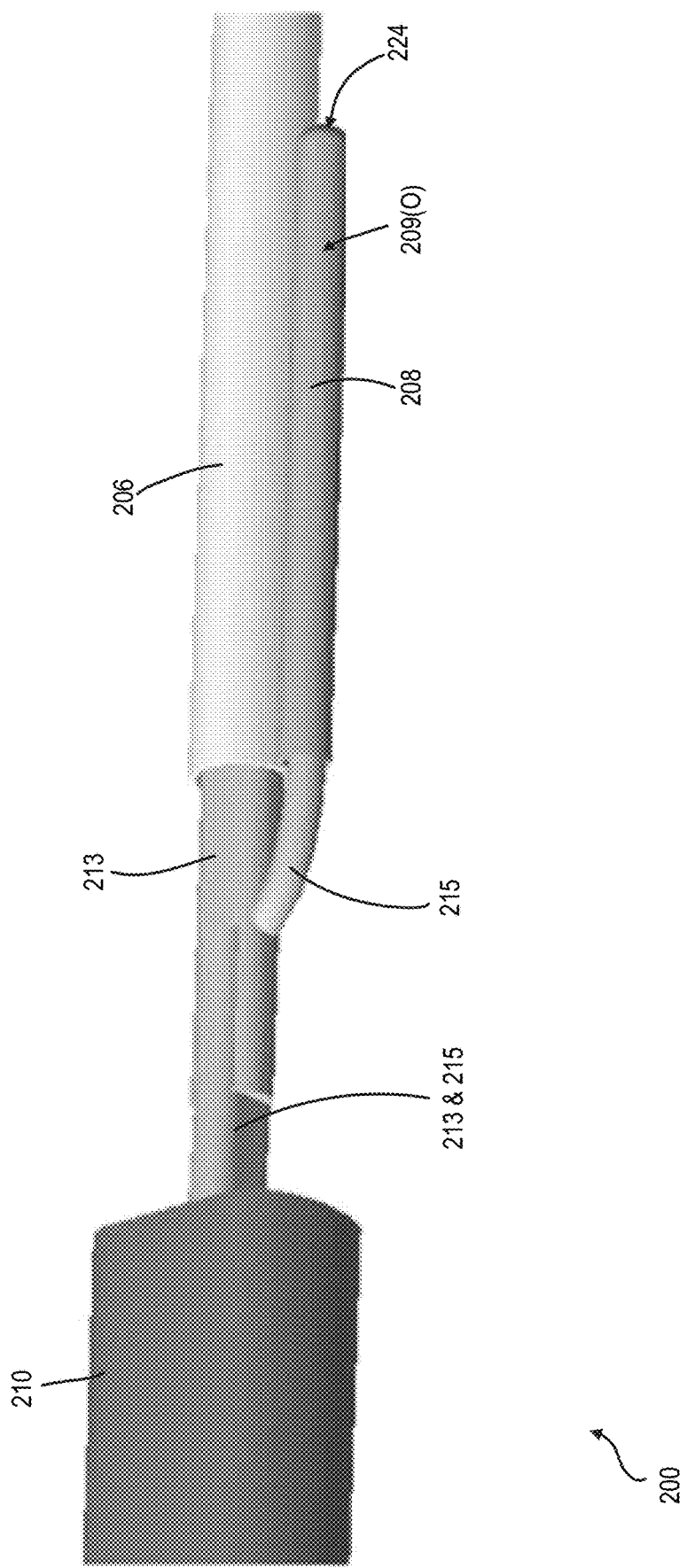
FIG. 5 shows the dual-sensor waterproof temperature monitoring probe of FIG. 4 with a molding retracted to show internal connectivity, in an embodiment.
Figure 6:
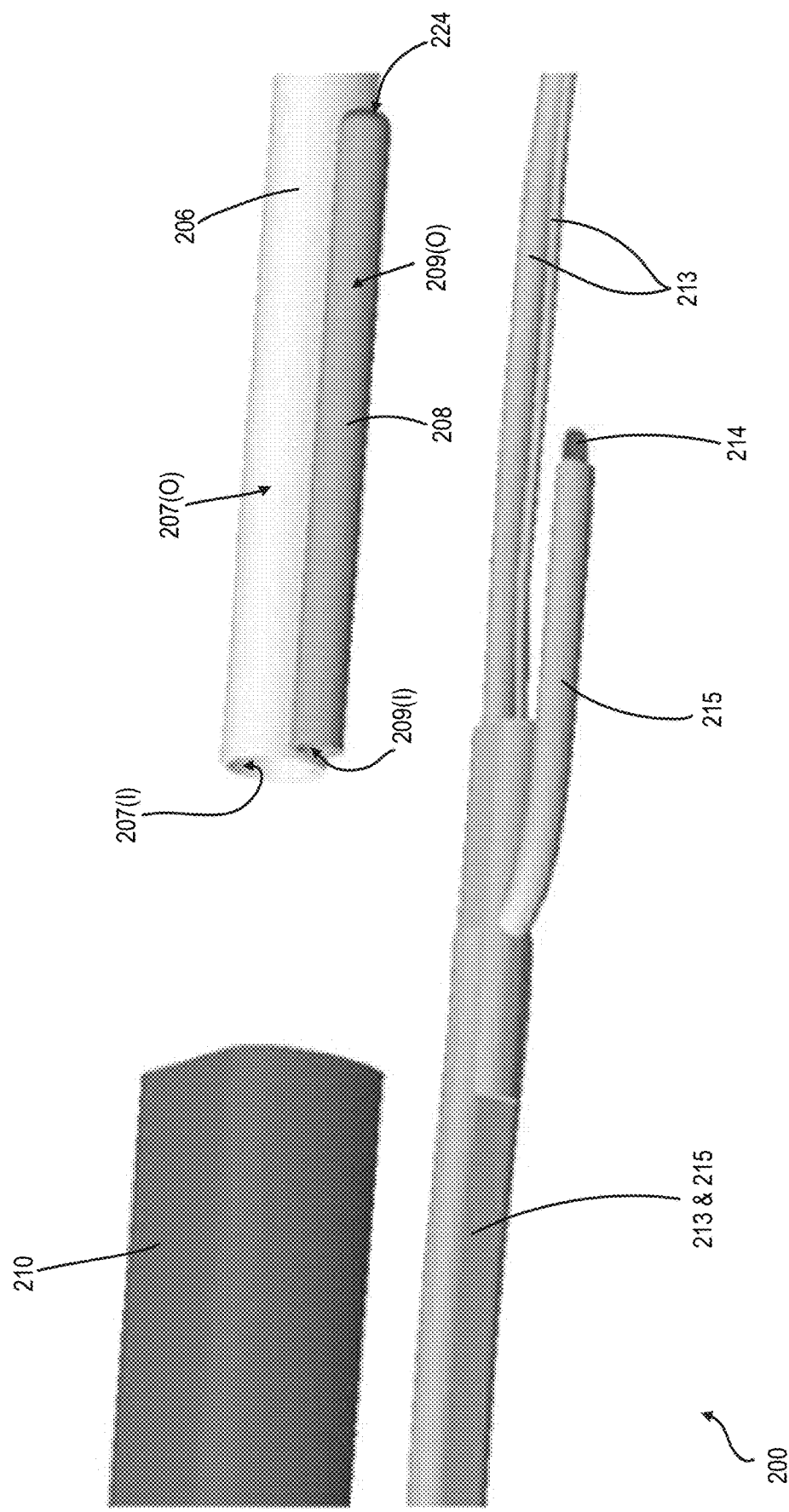
FIG. 6 shows example internal components of the dual-sensor waterproof temperature monitoring probe of FIG. 4.
Figure 13:
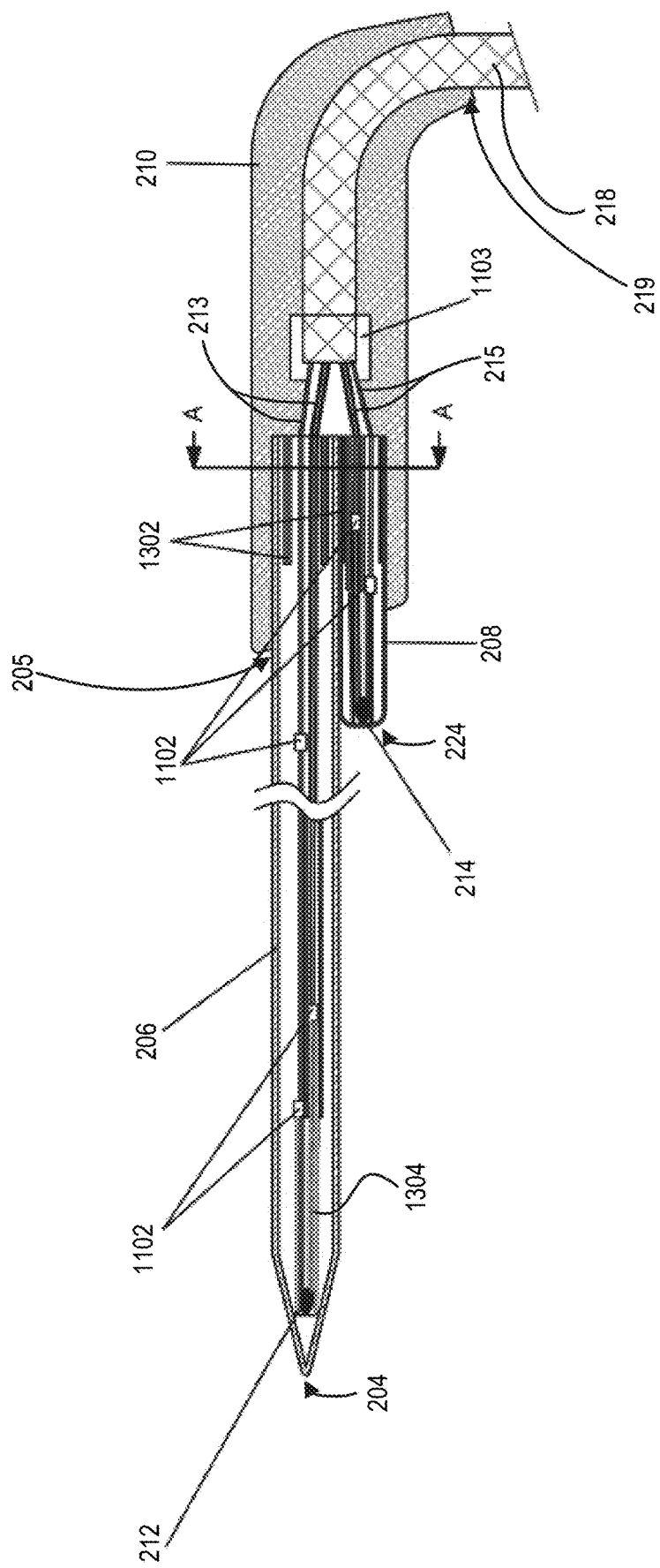
FIG. 13 is a partial cross-sectional view of an embodiment of the dual-sensor waterproof temperature monitoring probe of FIGS. 4-6.
Figure 14A:
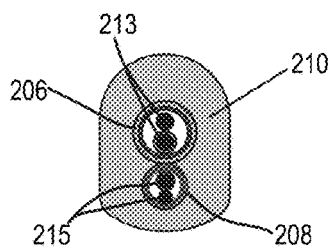
FIG. 14A is a cross-sectional view of the dual-sensor waterproof temperature monitoring probe of FIG. 13 along section line A-A.
Figure 14B:
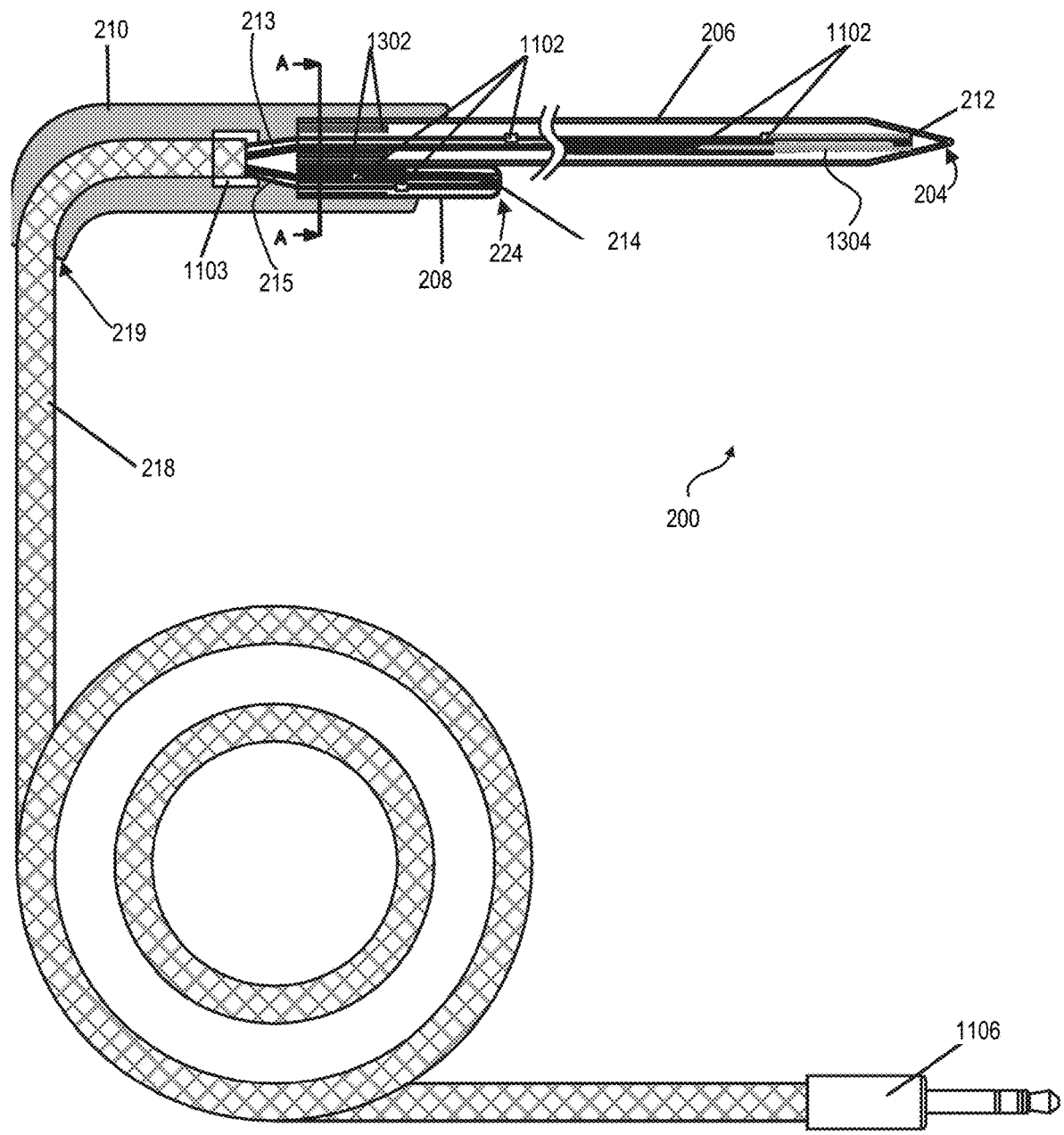
FIG. 14B is another partial cross-sectional view of the dual-sensor waterproof temperature monitoring probe of FIG. 13.

FIG. 4 depicts a dual-sensor waterproof temperature monitoring probe 200 with an auxiliary hollow tube. FIG. 5 shows the dual-sensor waterproof temperature monitoring probe of FIG. 4 with a molding retracted to show internal connectivity, in an embodiment. FIG. 6 shows example internal components of the dual-sensor waterproof temperature monitoring probe of FIG. 4. FIGS. 13, 14A, and 14B show partial cross-sectional views of an embodiment of probe 200. FIGS. 4-6, 13, 14A, and 14B are best viewed together with the following description.

Dual-sensor waterproof temperature monitoring probe 200 is configured for in situ monitoring temperature of food during the cooking process. Probe 200 includes a primary hollow tube 206, with a first end 204, an auxiliary hollow tube 208, with first end 224. Primary and secondary hollow tubes 206 and 208 have second ends 205 and 225, respectively. In an embodiment, second ends 205 and 225 are flush with each other. In certain embodiments, hollow tubes 206 and 208 at first ends 204 and 224, respectfully, are closed or sealed. In an embodiment, first end 204 includes a pointed tip. Tubes 206 and 208 are parallel to each other. Tube 208 may be shorter in length than tube 206. Tube 208 may have a smaller diameter than tube 206. Hollow tubes 206 and 208 are attached to each other, for example by an adhesive or a welded joint. A food temperature sensor 212 is positioned within primary hollow tube 206 at first end 204 and an ambient temperature sensor 214 is positioned within auxiliary hollow tube 208 at first end 204. Probe 200 further includes wires 213 and wires 215. Wires 213 are electrically coupled to food temperature sensor 212 and wires 215 are electrically coupled to ambient temperature sensor 214, as illustrated in FIGS. 2 and 3. Wires 113 are electrically insulated or isolated from wires 115 inside probe 200. In one embodiment, as illustrated in FIGS. 13 and 14B, sensor 212 is coupled to wires 213 and sensor 214 is coupled to wires 215 via copper clips or bump welds 1102.

In one example of operation, a portion or all of tube 206 is disposed within a food item and tube 208 remains outside of the food item.

In one embodiment, one or both of primary and auxiliary hollow tubes 206 and 208, respectively, are made from metal such as stainless steel. In another embodiment, one or both of tubes 206 and 208 are made from high temperature resistant plastic. However, tubes 206 and 208 may be made from one or more other materials capable of substantially retaining structural and chemical integrity at cooking temperatures (e.g., at least 500 degrees Fahrenheit) without departing from the scope hereof. Each of outer surfaces 207(O) and 209(O) of hollow tubes 206 and 208, respectively, may have a non-stick coating (e.g., Teflon®), for ease of cleaning.

Wires 213 and 215 exit probe 200 at a back end 219 of probe 200, opposite of first end 204, of tube 206, as illustrated in FIG. 1. At back end 209, wires 213 and 215 are grouped together to form a cable 218. Wires 213 are electrically insulated or isolated from wires 215 within cable 218, which may include a braided wire shell, similar to cable 118 of probe 100.

Probe 200 further includes a handle 210 which surrounds a portion of each of hollow tubes 206 and 208 as well as wires 213 and 215 between second ends 205 and 225 and back end 219. Features, properties, function, and method of manufacture of handle 210 are common with embodiments of handle 110, such providing a permanent waterproof seal that prevents moisture from entering inside probe 200, including the inside of each of tubes 206 and 208. Probe 200 may thereby be washed manually, soaked in water, or washed in an automatic dishwasher.

In certain embodiments, probe 200 includes features common to corresponding embodiments of probe 200 such as a glass fiber tube, a first seal, a second seal, and/or a securing structure. For example, probe 200 may include a glass fiber tube disposed within one or both of primary hollow tube 206 auxiliary hollow tube 208. For example, probe 200 may include a first seal surrounding at least a part of each of the one or more glass fiber tubes. In an embodiment, probe 200 may include a second seal (e.g., seal 1302, FIG. 13) surrounding portions of one or both of wires 213 and 215 within respective tube 206 or 208 where handle 210 surrounds respective tube 206 or 208. The second seal may surround portions of respective hollow tube 206 and/or 208 to provide moisture protection, for example. Second seal 1302 provides thermal protection for respective wires 213 and/or 215 during probe operation and/or during manufacture of the probe (e.g., during high temperature mold injection). In another embodiment, probe 200 may include a securing structure that prevents handle 210 from separating from tubes 206 and 208. Probe 200 may further include a third seal 1304, which is similar to third seal 1104, within hollow tube 206 and at first end 204 to provide additional electrical insulation between wires 213 and hollow tube 206.

Other embodiments of the dual-sensor waterproof temperature monitoring probes featured herein may have any combination of features of probe 100 and probe 200.

Figure 7:
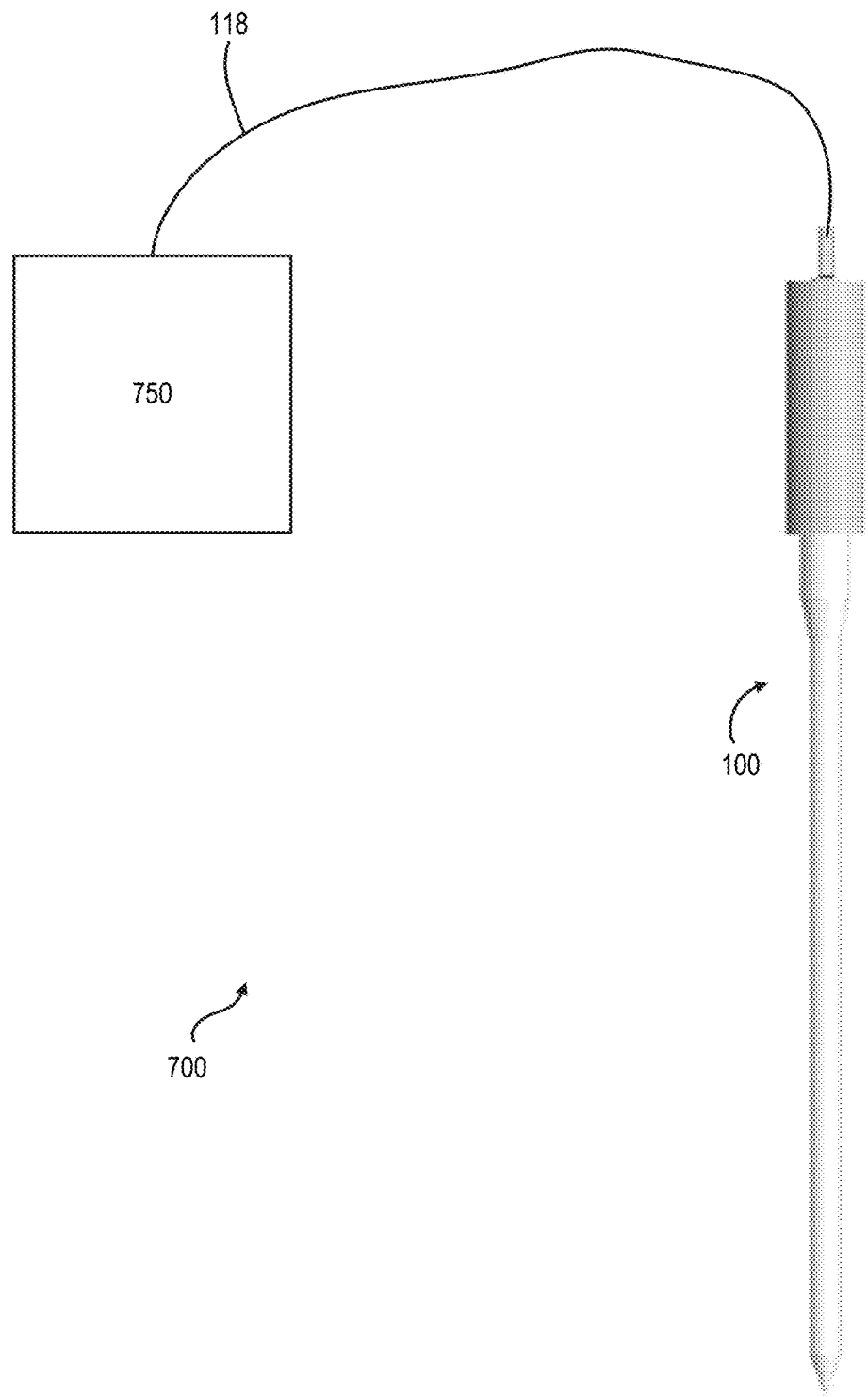
FIG. 7 illustrates one example dual-sensor waterproof temperature monitoring system, in an embodiment, for sensing temperature of food and temperature of a cooking environment using the dual-sensor waterproof temperature monitoring probe of FIG. 1.

FIG. 7 illustrates dual-sensor waterproof temperature monitoring probe system 700, which is one example embodiment of the dual-sensor waterproof temperature monitoring probe systems featured herein. System 700 includes any embodiment of the dual-sensor waterproof temperature monitoring probes featured herein. For example, FIG. 7 illustrates system 700 having probe 100. Purely for simplicity, discussion of system 700 hereinafter includes features of probe 100, such as cable 118, but system 700 may include features of probe 200, for example. Certain embodiments of system 700 include certain features of the dual thermometer system of U.S. Pat. No. 7,128,466 to Chang, et al (hereinafter referred to as "Chang"), which is incorporated herein by reference. System 700 includes a display/control unit 750. Display unit 750 may be an electronic display for displaying the temperature read from the food and ambient temperature sensors (e.g., sensors 112 and 114 of probe 100). Display unit 750 may have features common with embodiments of the LCD module in Chang (Chang item 16). In one embodiment, display unit 750 is a mobile display such as a computer, a tablet, smartphone or other mobile electronic device that communicates with probe 100 via cable 118.

System 700 includes a plug (e.g., 1106 or Chu item 124) at an end of cable 118 opposite of probe 100. Cable 118, in system 700, may be any length suitable for use of the dual-sensor waterproof temperature monitoring probe. The plug is electrically coupled to wires 113 and 115. Wires 113 are electrically insulated or isolated from wires 115 within the plug. The plug provides electrical coupling of wires 113 and 115 to display unit 750.

Figure 8:
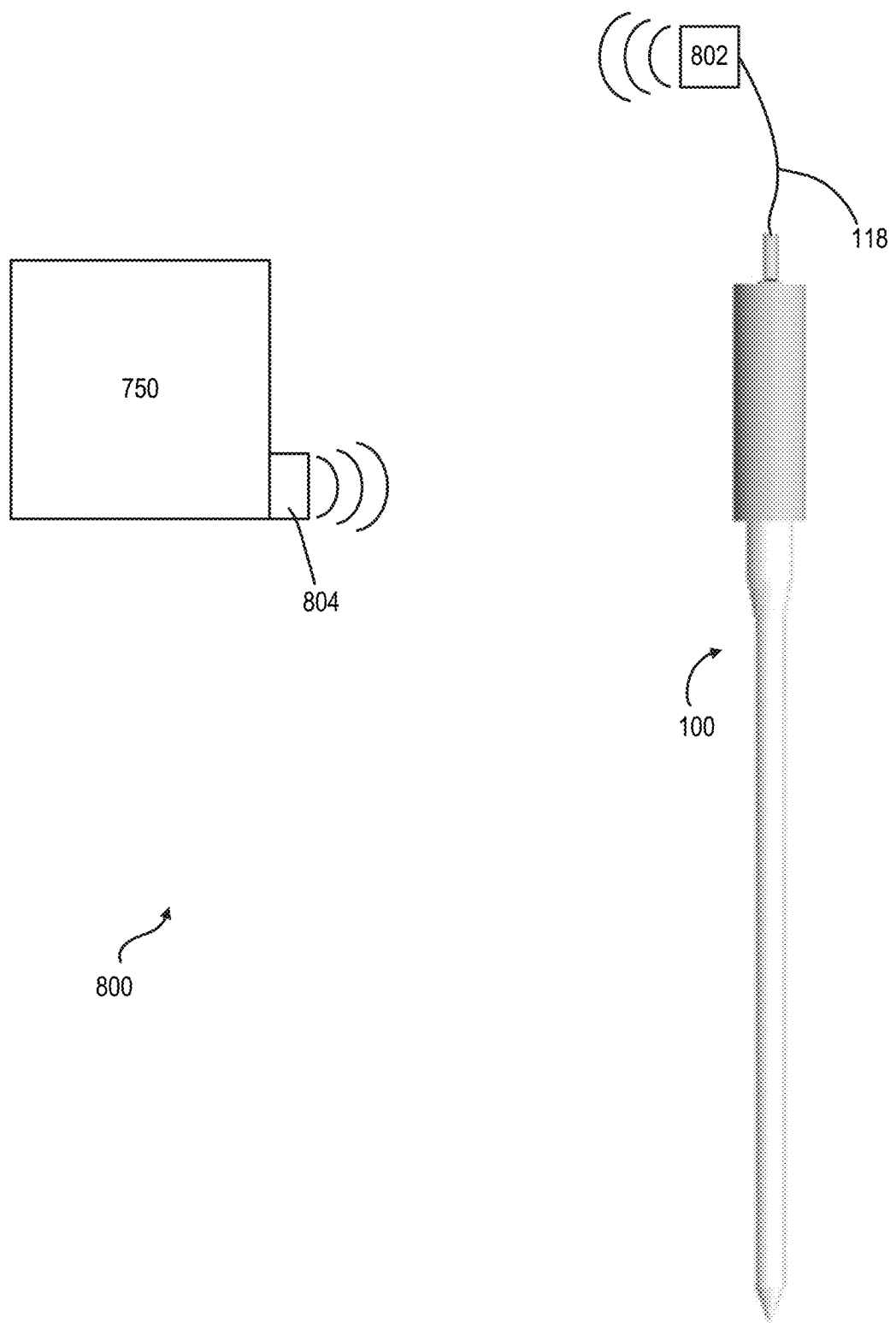
FIG. 8 illustrates another example dual-sensor waterproof temperature monitoring system, in an embodiment, for sensing temperature of food and temperature of a cooking environment using the dual-sensor waterproof temperature monitoring probe of FIG. 1.

FIG. 8 illustrates dual-sensor waterproof temperature monitoring probe system 800, which is one example embodiment of the dual-sensor waterproof temperature monitoring probe systems featured herein. System 800 includes any embodiment of the dual-sensor waterproof temperature monitoring probes featured herein. For example, FIG. 8 illustrate system 800 having probe 100. Purely for simplicity, discussion of system 800 hereinafter includes features of probe 100, such as cable 118, but system 800 may include features of probe 200, for example. Certain embodiments of system 800 include certain features of the dual thermometer system of Chang. System 800 includes display/control unit 750, having certain features in common display unit 750 in system 700.

System 800 includes a wireless transmitter 802 at an end cable 118, opposite of probe 100. Cable 118, in system 800, may be any length suitable for use of the dual-sensor waterproof temperature monitoring probe. Wireless transmitter 802 is electrically coupled to wires 113 and 115. Wireless transmitter 802 communicates with a wireless signal receiver 804, which may be integrated with display unit 750 and is electrically coupled to display unit 750.

Figure 9:
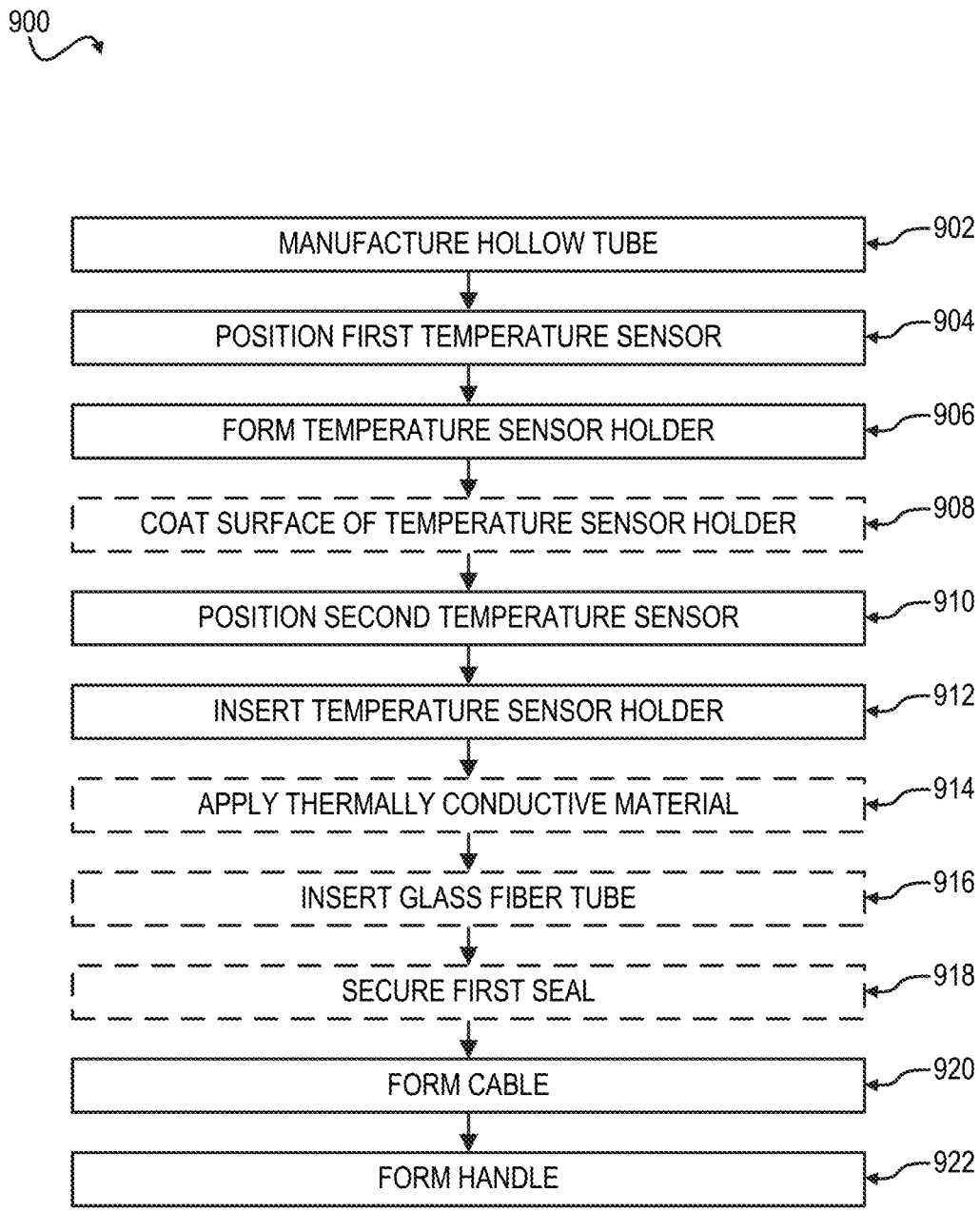
FIG. 9 is a flowchart illustrating one example method for manufacture of the dual-sensor waterproof temperature monitoring probe of FIG. 1, in an embodiment.

FIG. 9 is a flowchart illustrating one example method 900 for manufacture of dual-sensor waterproof temperature monitoring probe 100 of FIG. 1, including a temperature sensor holder 116. Dashed lines within FIG. 9 represent optional steps.

In step 902, method 900 manufactures a hollow tube of a dual-sensor waterproof temperature monitoring probe having a first diameter, a second diameter, and a transition therebetween. For example, in step 902, method 900 manufactures hollow tube 102, of probe 100, with first diameter 106, second diameter 108, and transition 107. In an embodiment of step 902, hollow tube 102 is manufactured with a sealed/closed first end and an open second end. In an embodiment, in step 902, method 900 further manufactures a securing structure (e.g., Chu item 144, Chu item 842, Chu items 942-945, or Chu items 1042-1045). In step 902, method 900 may manufacture hollow tube 102 using a sheet of metal such as stainless steel that is rolled, welded, cut and/or polished into the desired shape and size.

In step 904, method 900 positions a food temperature sensor, and corresponding electrically coupled wires, within the hollow tube of step 902. For example, in step 904, method 900 positions food sensor 112 at first end 104 within first diameter 106 of hollow tube 102, with wires 113 running between temperature sensor 112 at first end 104 and second end 105. In one embodiment of step 904, sensor 112 is freely secured within hollow tube 102. In another embodiment of step 904, a thermal coupling (e.g., a thermally conducting paste) may be used between sensor 112 and hollow tube 102 at first end 104.

In step 906, method 900 forms temperature sensor holder 116. In one example of step 906, the temperature sensor holder is formed of an electrically insulating material, such as a polymer and shaped to (a) tightly fit into tube 102 of temperature probe 100, to (b) fit temperature sensor 114, to (c) press temperature sensor 114 against inside surface 122 of hollow tube 102. In an example of step 906, method 900 shapes temperature sensor holder as depicted in FIGS. 2-3. In another example of step 906, the temperature sensor holder is formed of a metallic material. The shape of the temperature sensor holder includes central groove or fold 117(1), within which a temperature sensor is fitted in a later step. In certain embodiments, groove 117(1) is manufactured with an internal angle (e.g., 119), designed to fit temperature sensor 114 tightly within. In other embodiments, central groove 117(1) is straight. In an example of step 906, the temperature sensor holder of method 900 may be further shaped to include additional grooves 117(2) or folds to fit additional wires 113, for example, and optionally isolate the additional wires from temperature sensor 114. In another example of step 906, temperature sensor holder 116 is manufactured using injection molding. In another example of step 906, temperature sensor holder 116 is formed by applying pressure and/or heat to a differently-shaped or flat object. In another example of step 906, the central groove of temperature sensor holder 116 is formed by cutting or etching.

Step 908 is optional. If included, in step 908, method 900 coats an external surface of temperature sensor holder 116 with an electrically insulating material. In certain embodiments, the coating is deposited by spray coating, curtain coating, or chemical vapor deposition.

In step 910, method 900 positions a temperature sensor (114) within central groove 117(1) of temperature sensor holder 116 such that temperature sensor 114 is tightly fitted in central groove, or fold, 117(1), such as depicted in FIG. 2, for example. In an embodiment of step 910, wires 115, which are electrically coupled to temperature sensor 114, also fit through a portion of central groove 117(1). In another embodiment of step 910, method 900 includes using an adhesive to secure temperature sensor 114 within central groove 117(1) of the temperature sensor holder with an adhesive. In another example of step 910, other wires 113 are fit through additional grooves (e.g., 117(2)) of temperature sensor holder 116.

In step 912, method 900 inserts the temperature sensor holder, and the temperature sensor secured therein, of steps 906-910 into the hollow tube of step 902. In an example of step 912, method 900 inserts temperature sensor holder 116 into hollow tube 102 at second diameter 108. In an embodiment of step 912, temperature sensor holder 116 is positioned such that temperature sensor 114 is in thermal contact with inside surface 122 hollow tube 102 of temperature probe 100.

Step 914 is optional. If included, in step 914, method 900 applies a thermally conductive material such as a paste, not restricted to an adhesive, between temperature sensor holder 116 and temperature sensor 114 and/or between temperature sensor 114 and inside surface 122 of hollow tube 102 to improve thermal coupling.

Step 916 is optional. If included, in step 916, method 900 inserts and secures a glass fiber tube (e.g., Chu item 112) within the hollow tube manufactured in step 902. Wires 113 may run through the glass fiber tube between first end 104 and second end 105. The glass fiber tube may be retained within hollow tube 120 via crimping of second end 105 of hollow tube 120 such that pressure applied at second end 105 seals the first seal, of step 918, thereby permanently affixing the glass fiber tube.

Step 918 is optional. In step 918, method 900 secures a first seal (e.g., Chu item 114) within the hollow tube of step 902. For example, first seal is a heat-shrink tube that is heat shrunk to the glass fiber tube between the glass fiber tube and hollow tube 100.

In step 920, method 900 groups wires 113 and 115 to form a cable (e.g., 118). In an embodiment of step 920, cable 118 includes a braided wire shell. Wires 113 are electrically insulated or isolated from wires 115 within cable 118. In an embodiment, wires 113 and 115 may be grouped to form cable 118 at second end 105 of probe 100. In another embodiment of step 920, wires 113 and 115 may be grouped to form cable 118 at back end 109 of probe 100. In an embodiment of step 920, a plug and/or transmitter (e.g., 802) is electrically coupled to wires 113 and 115, within cable 118.

In step 922, a handle is molded around a portion of probe 100. In an embodiment of step 922, handle 110 is formed around a portion of wires 113 and 115 (e.g., cable 118) and a portion of hollow tube 102. In another embodiment, handle 110 is formed around the securing structure of step 902 such that handle 110 will not release from probe 100. In an embodiment, handle 110 is made from high temperature resistant plastic. In step 922, after it is formed, handle 110 provides a waterproof seal, preventing moisture from entering inside probe 100, such that probe 100 is waterproof. Furthermore, in step 922, handle 110 retains structural and chemical integrity at cooking temperatures (for example, up to at least 500 degrees Fahrenheit).

It will be appreciated that steps 902-922 are not limited in scope to the order as illustrated in FIG. 9. Any combination of the above steps may be performed in parallel.

Figure 10:
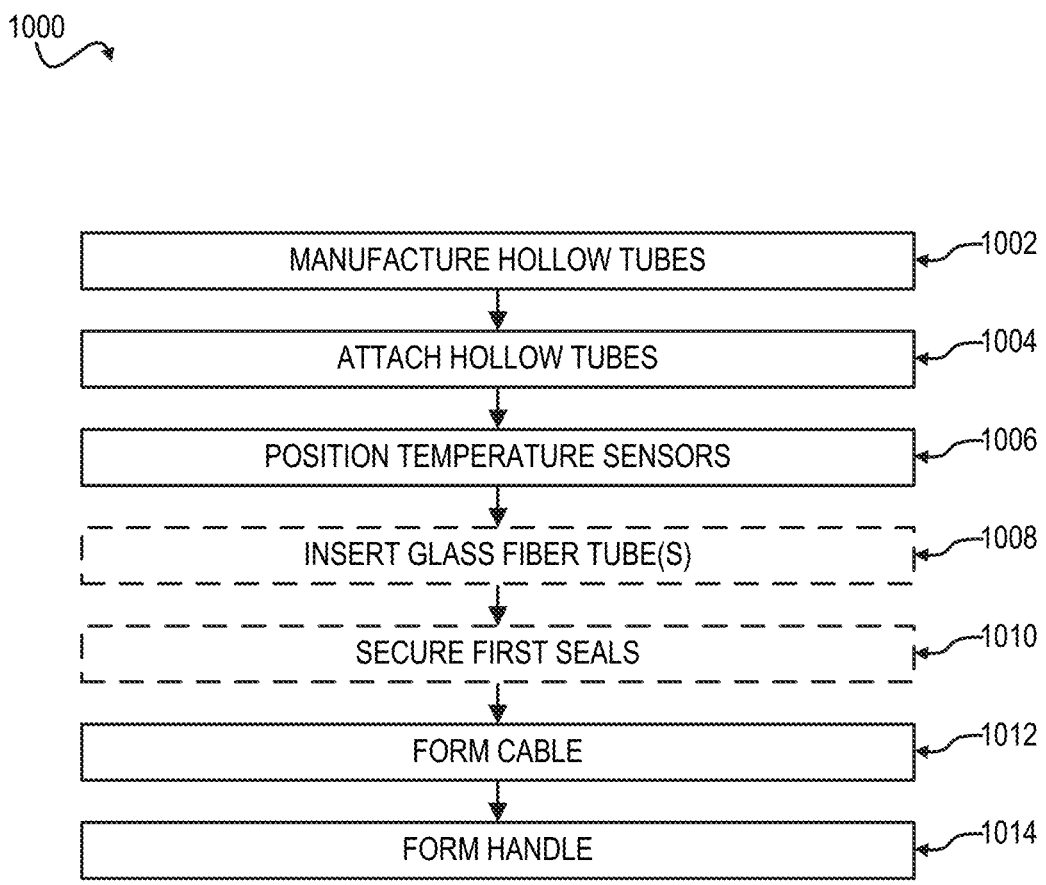
FIG. 10 is a flowchart illustrating one example method for manufacture of the dual-sensor waterproof temperature monitoring probe of FIG. 4, in an embodiment.

FIG. 10 is a flowchart illustrating one example method 1000 for manufacture of dual-sensor waterproof temperature monitoring probe 200 of FIG. 4.

In step 1002, method 1000 manufactures primary and auxiliary hollow tubes 206 and 208, respectfully, of probe 200. In step 1002, hollow tubes 206 and 208 are manufactured with first open ends 204 and 224, respectfully, and second closed ends, 205 and 225, respectfully. In one embodiment of step 1002, method 1002 further manufactures a securing structure (e.g., Chu item 144, Chu item 842, Chu items 942-945, or Chu items 1042-1045). In step 1002, method 1000 may manufacture each of hollow tubes 206 and 208 using a sheet of metal such as stainless steel that are rolled, welded, cut and/or polished into the desired shape and size.

In step 1004, method 1000 attaches hollow tube 206 and hollow tube 208 to each other. In one embodiment of step 1004, hollow tubes 206 and 208 are attached via an adhesive. In another embodiment of step 1004, hollow tubes 206 and 208 are attached via welding.

In step 1006, method 1000 positions food and ambient temperature sensors 212 and 214 within hollow tubes 206 and 208, of step 1002, at first ends 204 and 224, respectively. In one embodiment of step 1006, wires 213 are electrically coupled to sensor 212 and wires 215 are electrically coupled to sensor 214 before sensors 212 and 214 are inserted into tubes 206 and 208, respectively. In another embodiment of step 1006, wires 213 are electrically coupled to sensor 212 and wires 215 are electrically coupled to sensor 214 after sensors 212 and 214 are positioned within hollow tubes 206 and 208, respectively. In an embodiment of step 1006, food temperature sensor 212 is freely secured within primary hollow tube 206. In this embodiment, sensor 212 and respective connecting wires 213 may be guided within primary hollow tube 206 until sensor 212 reaches first end 204. In another embodiment, ambient temperature sensor 214 is freely secured within auxiliary hollow tube 208 at first end 224. In this embodiment, sensor 214 and respective connecting wires 215 are guided within auxiliary hollow tube 208 until sensor 214 reaches first end 224. In another embodiment of step 1006, a thermal coupling (e.g., a thermally conducting paste) may be used between food temperature sensor 212 and hollow tube 206 at end 204. In another embodiment of step 1006, a thermal coupling may be used between ambient temperature sensor 214 and hollow tube 208 at end 224.

Step 1008 is optional. In step 1008, if included, method 1000 inserts a glass fiber tube (e.g., Chu item 112) within one of or each of both the hollow tubes manufactured in step 1002. In certain embodiments of step 1008, wires 213 or 215 run through each glass fiber tube between first end 204 or 224, respectively, and second end 205 or 225, respectively. Each glass fiber tube may be retained within its respective hollow tube (primary or auxiliary hollow tube 206 or 208) via crimping of respective second end 205 or 225, such that pressure applied at second end 205 or 225 seals the primary and auxiliary first seals, of step 1010, thereby permanently affixing the respective glass fiber tube.

Step 1010 is optional. In step 1010, if included, method 1000 secures primary and auxiliary first seals (e.g., Chu item 114) within primary and auxiliary hollow tubes 206 and 208, of step 1002, respectively. In an example of step 1010, each of primary and auxiliary first seals is a heat-shrink tube that is heat shrunk to the respective glass fiber tube between the glass fiber tube and respective primary or auxiliary hollow tube 206 or 208.

In step 1012, method 1000 groups wires 213 and 215 to form a cable (e.g., 218). In an embodiment of step 1012, cable 218 includes a braided wire shell. Wires 213 are electrically insulated or isolated from wires 215 within cable 218. In one embodiment of step 1012, wires 213 and 215 may be grouped to form cable 218 at second end 205 of probe 200. In another embodiment of step 920, wires 213 and 215 may be grouped to form cable 218 at back end 219 of probe 200. In an embodiment of step 1012, a plug and/or transmitter (e.g., 802) is electrically coupled to wires 213 and 215, within cable 218, at an end of cable 218.

In step 1014, a handle is molded around a portion of probe 200. In an embodiment of step 1014, handle 210 is formed around a portion of wires 213 and 215 (e.g., cable 118) and a portion of each of hollow tubes 206 and 208. In another embodiment, handle 210 is formed around the securing structure of step 1002 such that handle 210 will not release from probe 200. In an embodiment, handle 210 is made from high temperature resistant plastic. In step 1014, after it is formed, handle 210 provides a waterproof seal, preventing moisture from entering inside probe 200, such that probe 200 is waterproof. Furthermore, in step 1014, handle 210 retains structural and chemical integrity at cooking temperatures (for example, up to at least 500 degrees Fahrenheit).

It will be appreciated that steps 1002-1014 are not limited in scope to the order as illustrated in FIG. 10. Any combination of the above steps may be performed in parallel.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present system and method, which, as a matter of language, might be said to fall there between.

What is claimed is:

1. A dual-sensor waterproof temperature monitoring probe, comprising:
   a primary hollow tube having a first open end and a first closed end opposite of the first open end, the first closed end comprising a pointed tip;
   an auxiliary hollow tube having a shorter length than the primary hollow tube, the auxiliary hollow tube having a second open end and a second closed end opposite of the second open end, the second closed end having a rounded tip, and the auxiliary tube being positioned parallel to and adjacent to the primary hollow tube;
   a first temperature sensor located inside the primary hollow tube at the first closed end;
   a second temperature sensor located inside the auxiliary hollow tube at the second closed end;
   one or more first electrical wires electrically coupled with the first temperature sensor;
   one or more second electrical wires electrically coupled with the second temperature sensor;
   a cable, the cable including the one or more first electrical wires and the one or more second electrical wires; and
   a handle permanently covering and permanently sealing the first open end and the second open end and around at least part of the cable.

2. The probe of claim 1, the primary and the auxiliary hollow tubes being coupled together by an adhesive.

3. The probe of claim 1, the primary and the auxiliary hollow tubes being coupled together by a weld.

4. The probe of claim 1, the auxiliary hollow tube having a smaller diameter than the primary hollow tube.

5. The probe of claim 1, the first open end and second open end being flush with each other.

6. The probe of claim 1, further comprising a handle configured to prevent water from entering the primary and auxiliary hollow tubes and being capable of retaining structural and chemical integrity at temperatures up to 500 degrees Fahrenheit.

7. The probe of claim 6, further comprising a metal clip coupling the one or more first electrical wires and the one or more second electrical wires to the cable, the handle covering the clip.

8. The probe of claim 1, the first open end flush with the second open end.

9. A method for manufacturing a dual-sensor waterproof temperature monitoring probe, the method comprising:
   manufacturing a primary hollow tube and an auxiliary hollow tube, the primary hollow tube having a first open end and a first closed end opposite of the first open end, the first closed end having a pointed tip, the auxiliary hollow tube having a second open end and a second closed end opposite of the second open end, the second closed end having a rounded tip, the auxiliary hollow tube having a shorter length than the primary hollow tube;
   attaching the auxiliary hollow tube to the primary hollow tube, the auxiliary hollow tube being parallel to the primary hollow tube;
   positioning a first and a second temperature sensor within the primary and the auxiliary hollow tubes, respectively, the first and second temperature sensors being electrically coupled to one or more first and second electrical wires, respectively;
   forming a cable, the couple comprising the one or more first and second electrical wires; and
   forming a handle, the handle permanently sealing the hollow tube at the second end and sealing around the one or more first and second electrical wires, the handle further preventing water from entering the hollow tube and being capable of substantially retaining structural and chemical integrity at temperatures up to about 500 degrees Fahrenheit.

10. The method of claim 9, the method further comprising inserting a first glass fiber tube the primary hollow tube and inserting a second glass fiber tube within the auxiliary hollow tube.

11. The method of claim 9, the method further comprising securing a primary first seal within the primary hollow tube and an auxiliary first seal within the auxiliary hollow tube, the primary and auxiliary first seals each comprising a heat-shrink material covering a portion of the cable and a portion of the primary and auxiliary hollow tubes, respectively, at the first open end and second end, respectively.

12. The method of claim 9, further comprising coupling the one or more first electrical wires and the one or more second electrical wires to the cable, the handle covering the clip.

* * * * *